(12) United States Patent
Kase et al.

(10) Patent No.: US 12,155,460 B2
(45) Date of Patent: Nov. 26, 2024

(54) TRANSMITTING APPARATUS, RECEIVING APPARATUS, COMMUNICATION SYSTEM, AND COMMUNICATION METHOD

(71) Applicant: NEC Corporation, Tokyo (JP)

(72) Inventors: Yuma Kase, Tokyo (JP); Shinichi Hori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 17/949,369

(22) Filed: Sep. 21, 2022

(65) Prior Publication Data

US 2023/0198654 A1 Jun. 22, 2023

(30) Foreign Application Priority Data

Oct. 7, 2021 (JP) .................................. 2021-165332

(51) Int. Cl.
*H04J 14/08* (2006.01)
*H04B 10/548* (2013.01)
*H04J 14/02* (2006.01)

(52) U.S. Cl.
CPC ............ *H04J 14/08* (2013.01); *H04B 10/548* (2013.01); *H04J 14/02* (2013.01)

(58) Field of Classification Search
CPC ... H04J 14/08; H04B 10/5161; H04B 10/532; H04B 10/548–5561
See application file for complete search history.

(56) References Cited

U.S. PATENT DOCUMENTS

| | | | |
|---|---|---|---|
| 2008/0107202 A1* | 5/2008 | Lee | H04L 27/18 375/267 |
| 2018/0376226 A1* | 12/2018 | Nomura | H04Q 11/0001 |
| 2019/0280809 A1* | 9/2019 | Cho | H04L 25/03343 |

FOREIGN PATENT DOCUMENTS

| | | |
|---|---|---|
| JP | 2006-304194 A | 11/2006 |
| JP | 2008-507164 A | 3/2008 |

* cited by examiner

*Primary Examiner* — Nathan M Cors (57) ABSTRACT

A transmitting apparatus according to the present disclosure includes: a digital baseband unit configured to separate a baseband signal into an in-phase component and a quadrature component, and output the in-phase and quadrature components; an outphasing signal generation unit configured to generate first and second outphasing signals based on the in-phase and quadrature components; and a time-division combining unit configured to generate a time-division combined signal by combining the first and second outphasing signals in a time-division manner.

10 Claims, 12 Drawing Sheets

TRANSMITTING APPARATUS, RECEIVING APPARATUS, COMMUNICATION SYSTEM, AND COMMUNICATION METHOD

INCORPORATION BY REFERENCE

This application is based upon and claims the benefit of priority from Japanese patent application No. 2021-165332, filed on Oct. 7, 2021, the disclosure of which is incorporated herein in its entirety by reference.

TECHNICAL FIELD

The present disclosure relates to a transmitting apparatus, a receiving apparatus, a communication system, and a communication method.

BACKGROUND ART

Japanese Unexamined Patent Application Publication No. 2006-304194 and Published Japanese Translation of PCT International Publication for Patent Application, No. 2008-507164 (hereinafter also referred to as Patent Literatures 1 and 2, respectively) each disclose an optical radio transmission system as a system for, in an access network of a mobile network, supplying radio waves at a low cost in a radio-wave weak area, such as in an underground shopping area or inside a building, in which radio waves of outdoor base stations are less likely to reach.

SUMMARY

In an optical radio transmission system in which a high-frequency radio signal generated by a parent device is transmitted directly to a child device through an optical fiber, there is no need to equip the child device with a digital-to-analog converter, so that the following can be expected: the cost for the child device may be reduced; the efficiency of the system may be improved; and the child device may be installed more easily.

In contrast, in an optical radio transmission method using an outphasing signal according to related art, a plurality of transmission lines (or a plurality of transmission channels) are required for signal transmission along one signal transmission route. Therefore, it is necessary to perform wavelength multiplexing or to use a plurality of optical modules and optical fibers.

Both of the above-described techniques may result in an increase in the cost for wiring optical modules and optical fibers. Patent Literatures 1 and 2 do not disclose any means capable of solving the above-described problem.

The present disclosure has been made in order to solve the above-described problem, and an example object thereof is to provide a transmitting apparatus, a receiving apparatus, a communication system, and a communication method capable of simplifying the configuration of an apparatus(es) necessary for transmitting an outphasing signal.

In a first example aspect, a transmitting apparatus includes:
a digital baseband unit configured to separate a baseband signal into an in-phase component and a quadrature component, and output the in-phase and quadrature components;
an outphasing signal generation unit configured to generate first and second outphasing signals based on the in-phase and quadrature components; and
a time-division combining unit configured to generate a time-division combined signal by combining the first and second outphasing signals in a time-division manner.

In another example aspect, a receiving apparatus includes:
a radio signal conversion unit configured to convert the time-division combined signal transmitted from the above-described transmitting apparatus into a radio signal; and
an antenna configured to emit the radio signal.

In another example aspect, a communication system includes: a transmitting apparatus and a receiving apparatus connected to the transmitting apparatus through an optical fiber module, in which
the transmitting apparatus includes:
a digital baseband unit configured to separate a baseband signal into an in-phase component and a quadrature component, and output the in-phase and quadrature components;
an outphasing signal generation unit configured to generate first and second outphasing signals based on the in-phase and quadrature components; and
a time-division combining unit configured to multiplex the first and second outphasing signals in a time-division manner.

In another example aspect, a communication method includes:
generating a plurality of outphasing signals based on an input signal;
combining the plurality of generated outphasing signals in a time-division manner;
transmitting a signal obtained by the time-division combining from a transmitting side to a receiving side; and
receiving the signal transmitted from the transmitting side on the receiving side.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

First Example Embodiment

<Configuration of Communication System>

Figure 1:
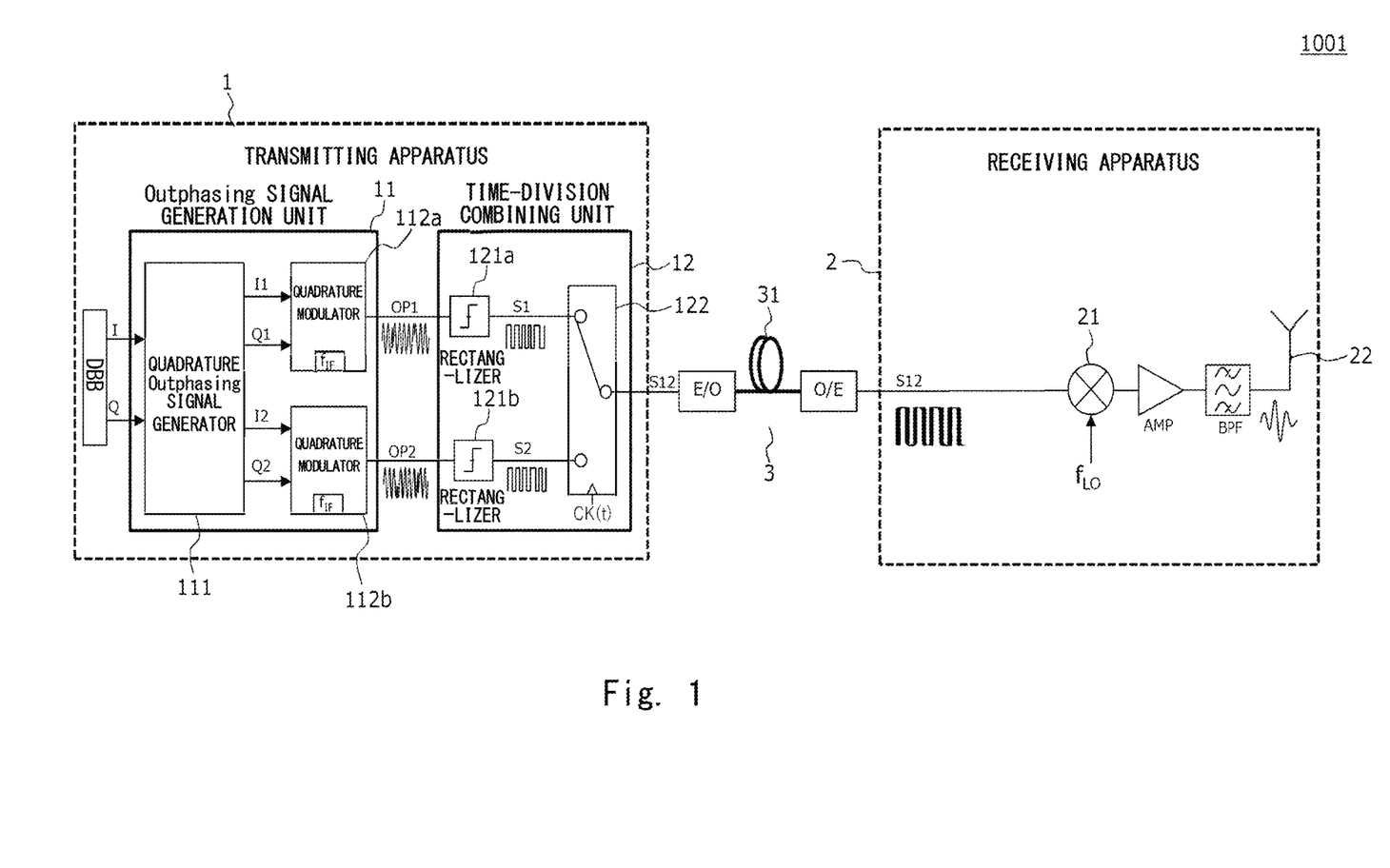
FIG. 1 is a block diagram showing a configuration of a communication system 1001 according to a first example embodiment.

A communication system according to a first example embodiment of the present disclosure will be described hereinafter in detail with reference to the drawings. FIG. 1 is a block diagram showing a configuration of a communication system 1001 according to the first example embodiment.

The communication system 1001 includes a transmitting apparatus 1, a receiving apparatus 2, and an optical fiber module(s) 3 connecting the transmitting apparatus 1 with the receiving apparatus 2.

The transmitting apparatus 1 includes a digital baseband unit DBB, an outphasing signal generation unit 11, and a time-division combining unit 12.

The digital baseband unit DBB generates two quadrature radio signals I and Q.

Note that the quadrature radio signals I and Q are modulated signals generated by quadrature-modulating a signal that is desired to be transmitted (hereinafter referred to as a desired signal IF), and have a phase difference of 90 degrees therebetween.

Note that the signal desired to be transmitted may be referred to as a baseband signal, and the quadrature radio signals I and Q may be referred to as an in-phase component and a quadrature component, respectively, of the baseband signal. That is, the baseband signal is separated into the in-phase component and the quadrature component, and these in-phase and quadrature components are output.

The outphasing signal generation unit 11 generates first and second outphasing signals based on the quadrature radio signals I and Q. The outphasing signal generation unit 11 includes a quadrature outphasing signal generator 111 and first and second quadrature modulators 112a and 112b. Hereinafter, when the quadrature modulators 112a and 112b do not need to be distinguished from each other, they are simply referred to as the quadrature modulator(s) 112.

The quadrature outphasing signal generator 111 generates a first pair of quadrature outphasing signals $I_1$ and $Q_1$ and a second pair of quadrature outphasing signals $I_2$ and $Q_2$ from the quadrature radio signals I and Q.

Note that the quadrature outphasing signals $I_1$ and $Q_1$ are signals that are obtained by separating the quadrature radio signals I and Q into two signals having different phases, and the quadrature outphasing signals $I_2$ and $Q_2$ are signals that are obtained by separating the quadrature radio signals I and Q into two signals having different phases.

Further, the difference between the phases of the quadrature outphasing signals $I_1$ and $Q_1$, and the difference between the phases of the quadrature outphasing signals $I_2$ and $Q_2$ are both 90 degrees.

The quadrature modulator 112 is a modulator that quadrature-modulates a pair of input quadrature outphasing signals at an intermediate frequency $f_{IF}$. An output signal Sqmod of the quadrature modulator is expressed by the below-shown Expression 1.

$$Sqmod = \cos \omega_{IF} t \cdot I_{in} + \sin \omega_{IF} t \cdot Q_{in} \quad \text{(Expression 1)}$$

In the expression, $\omega_{IF}$ is an angular frequency obtained by multiplying the intermediate frequency $f_{IF}$ by $2\pi$, and $I_{in}$ and $Q_{in}$ are a pair of quadrature signals input to the quadrature modulator 112.

The quadrature modulator 112 generates an outphasing signal $OP_1$ by quadrature-modulating the first set of quadrature outphasing signals $I_1$ and $Q_1$ based on the above-shown Expression 1.

Further, the quadrature modulator 112 generates an outphasing signal $OP_2$ by quadrature-modulating the second set of quadrature outphasing signals $I_2$ and $Q_2$ based on the above-shown Expression 1.

As described above, the outphasing signal generation unit 11 according to this example embodiment generates the outphasing signals $OP_1$ and $OP_2$ by separating the quadrature radio signals I and Q into the quadrature outphasing signals $I_1$, $I_2$, $Q_1$ and $Q_2$, and quadrature-modulating these quadrature outphasing signals.

However, the method according to which the outphasing signal generation unit 11 generates the outphasing signals $OP_1$ and $OP_2$ based on the quadrature radio signals I and Q is not limited to the above-described method. For example, the outphasing signals $OP_1$ and $OP_2$ may be generated by using an arithmetic circuit that directly generates signals expressed by mathematical expressions shown on the right sides of Expressions 12 and 14 (which will be described later).

The time-division combining unit 12 includes first and second rectangularizing units (i.e., units that converts waveforms of signals into rectangular waveforms) 121a and 121b, and a switch circuit 122. Hereinafter, when the rectangularizing units 121a and 121b do not need to be distinguished from each other, they are simply referred to as the rectangularizing unit(s) 121.

The rectangularizing unit 121 converts the waveform of an input signal into a rectangular waveform by, for example, performing a zero-comparison.

More specifically, the rectangularizing unit 121 converts the waveforms of the outphasing signals $OP_1$ and $OP_2$ into rectangular waveforms by performing zero-comparisons, and outputs the rectangular-waveform outphasing signals $S_1$ and $S_2$.

The switch circuit 122 combines two input signals in a time-division manner (i.e., in a time-sharing manner).

More specifically, the switch circuit 122 combines the rectangular-waveform signals $S_1$ and $S_2$ in a time-division manner (i.e., in a time-sharing manner) by alternately outputting them in a predetermined cycle, and thereby generates a combined signal $S_{12}$ containing the outphasing signals $OP_1$ and $OP_2$ as its signal components.

The optical fiber module 3 includes an electric-optical converter E/O that converts an electric signal into an optical signal, an optical fiber 31, and an optical-electric converter O/E that converts an optical signal into an electric signal.

The electric-optical converter E/O converts the combined signal $S_{12}$ output from the transmitting apparatus 1 into an optical signal, and then transmits the optical signal to the optical-electric converter O/E through the optical fiber 31.

The optical-electric converter O/E re-converts the optical signal received from the electric-optical converter E/O into an electric signal, i.e., restores it into the combined signal $S_{12}$, and outputs the combined signal $S_{12}$ to the receiving apparatus 2.

The receiving apparatus 2 includes a mixer circuit 21, a power amplifier AMP, a band-pass filter BPF, and an antenna 22. The mixer circuit 21, which is a mixer, multiplies the combined signal $S_{12}$ by an LO signal output from a local oscillator (not shown). In other words, the mixer circuit 21 converts the frequency of the combined signal $S_{12}$ output from the optical-electric converter O/E. More specifically, the mixer circuit 21 converts the frequency of the combined signal $S_{12}$ into a frequency that is expressed by the sum or difference of the original frequency of the combined signal $S_{12}$ and the frequency of the LO signal. The mixer circuit 21 outputs the frequency-converted combined signal $S_{12}$ to the power amplifier AMP.

The power amplifier AMP amplifies the combined signal $S_{12}$ output from the mixer circuit 21. The power amplifier AMP outputs the amplified combined signal $S_{12}$ to the band-pass filter BPF.

The band-pass filter BPF removes frequency components contained in a predetermined frequency band, and thereby generates a radio signal. For example, the band-pass filter BPF removes harmonic components that are caused by the rectangularization (i.e., the conversion into rectangular waveforms) and the signal amplification from the wavelength components contained in the combined signal $S_{12}$, and thereby generates a radio signal. The band-pass filter BPF outputs the generated radio signal to the antenna 22.

The antenna 22 emits (i.e., transmits) the radio signal output from the band-pass filter BPF into the air as radio waves.

By the above-described configuration, the communication system 1001 according to this example embodiment can transmit a plurality of outphasing signals through one transmission route by combining them in a time-division manner. As a result, there is no need to connect the transmitting apparatus 1 and the receiving apparatus 2 through a plurality of optical fiber modules 3, so that the configuration of the apparatus can be simplified.

<Operation of Communication System>

Operation performed by the communication system according to this example embodiment, i.e., a communication method according to this example embodiment will be described hereinafter in detail with reference to FIG. 1.

Firstly, in the transmitting apparatus 1, the digital baseband unit DBB generates quadrature radio signals I(t) and Q(t).

Note that the quadrature radio signals I(t) and Q(t) are expressed by the below-shown Expressions 2 and 3 by using an amplitude signal A(t) and a phase signal θ(t).

$$I(t)=A(t)\cos\theta(t) \quad \text{(Expression 2)}$$

$$Q(t)=A(t)\sin\theta(t) \quad \text{(Expression 3)}$$

Note that the amplitude signal A(t) and the phase signal θ(t) in the Expressions 2 and 3 are expressed by the below-shown Expressions 4 and 5.

$$A(t)=\sqrt{I(t)^2+Q(t)^2} \quad \text{(Expression 4)}$$

$$\theta(t)=\arctan(Q(t)/I(t)) \quad \text{(Expression 5)}$$

Next, in the outphasing signal generation unit 11, the quadrature outphasing signal generator 111 generates a first pair of quadrature outphasing signals $I_1(t)$ and $Q_1(t)$ and a second pair of quadrature outphasing signals $I_2(t)$ and $Q_1(t)$ from the quadrature radio signals I(t) and Q(t) so that they satisfy the below-shown Expressions 6 to 9.

$$I_1(t)=\cos(\theta(t)+\theta_{amp}(t)) \quad \text{(Expression 6)}$$

$$Q_1(t)=\sin(\theta(t)+\theta_{amp}(t)) \quad \text{(Expression 7)}$$

$$I_2(t)=\cos(\theta(t)-\theta_{amp}(t)) \quad \text{(Expression 8)}$$

$$Q_1(t)=\sin(\theta(t)-\theta_{amp}(t)) \quad \text{(Expression 9)}$$

Note that $\theta_{amp}(t)$ in the above-shown Expressions is a phase signal expressed by the below-shown Expression 10.

$$\theta_{amp}(t)=\arccos(A(t)/2) \quad \text{(Expression 10)}$$

Next, the first quadrature modulator 112a quadrature-modulates the first pair of quadrature outphasing signals $I_1(t)$ and $Q_1(t)$, and thereby outputs an outphasing signal $OP_1(t)$.

Further, the second quadrature modulator 112b quadrature-modulates the second pair of quadrature outphasing signals $I_2(t)$ and $Q_1(t)$, and thereby outputs an outphasing signal $OP_2(t)$.

Note that the outphasing signal $OP_1(t)$ output from the first quadrature modulator 112a is obtained by substituting the quadrature outphasing signal $I_1(t)$ for the quadrature signal $I_{in}$ and substituting the quadrature outphasing signal $Q_1(t)$ for the quadrature signal $Q_{in}$ in the above-shown Expression 1. The outphasing signal $OP_1(t)$ is a signal having a constant amplitude expressed by the below-shown Expression 11.

$$OP_1(t)=\cos\omega_{IF}+\sin\omega_{IF}t \cdot Q_1 \quad \text{(Expression 11)}$$

Further, by transforming the above-described Expression 11, it can also be expressed as the below-shown Expression 12.

$$OP_1(t)=\cos(\omega_{IF}t-\theta(t)-\theta_{amp}(t)) \quad \text{(Expression 12)}$$

The output signal $OP_2(t)$ of the second quadrature modulator 112b is obtained by substituting the quadrature outphasing signal $I_2(t)$ for the quadrature signal $I_{in}$ and substituting the quadrature outphasing signal $Q_2(t)$ for the quadrature signal $Q_{in}$ in the Expression 1, and is a signal having a constant amplitude expressed by the below-shown Expressions 13 and 14.

$$OP_2(t)=\cos\omega_{IF}t \cdot I_2+\sin\omega_{IF}t \cdot Q_2 \quad \text{(Expression 13)}$$

$$OP_2(t)=\cos(\omega_{IF}t-\theta(t)+\theta_{amp}(t)) \quad \text{(Expression 14)}$$

Based on the Expressions 10, 12 and 14, the sum of the outphasing signals $OP_1(t)$ and $OP_2(t)$ corresponds to a desired signal IF(t) expressed by the below-shown Expression 15.

$$IF(t)=A(t)\cos(\omega_{IF}t-\theta(t)) \quad \text{(Expression 15)}$$

The right side of the above-shown Expression is a general formula for a radio signal of which the amplitude is equal to A(t), the phase is equal to a phase signal θ(t), and the carrier frequency is equal to an intermediate frequency $f_{IF}$. And, corresponds to an expression that is obtained by substituting the quadrature signals I(t) and Q(t) for the quadrature signals $I_{in}$ and $Q_{in}$, respectively, in the relational expression between the input and output of the quadrature modulator expressed by the Expression (1).

Figure 2:
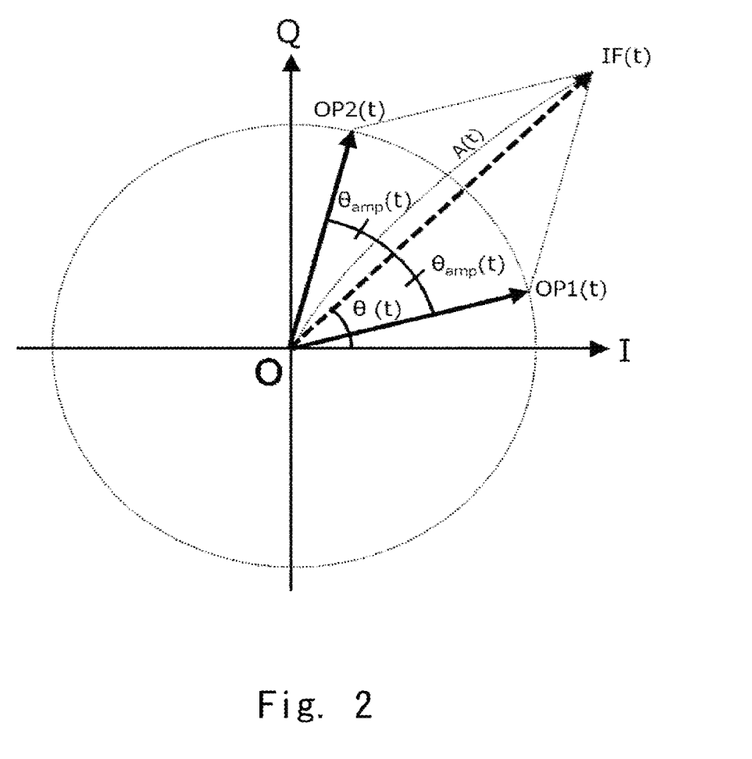
FIG. 2 is a vector diagram showing a relationship among a desired signal IF(t), a first outphasing signal $OP_1(t)$, and a second outphasing signal.

The relationship of the above-shown Expressions can also be explained by using a vector diagram shown in FIG. 2.

That is, the desired signal IF(t) can be expressed as a vector having a magnitude A(t) and a phase θ(t), and the outphasing signal $OP_1(t)$ can be expressed as a unit vector having a phase $\theta(t)-\theta\theta_{amp}(t)$. Further, the outphasing signal $OP_2(t)$ can be expressed as a unit vector having a phase $\theta(t)+\theta_{amp}(t)$.

Next, the first and second rectangularizing units 121a and 121b acquire the outphasing signals $OP_1(t)$ and $OP_2(t)$, respectively, and output rectangular-waveform outphasing signals $S_1(t)$ and $S_2(t)$, respectively. More specifically, the rectangularizing units 121 output signals having amplitude values of 1 when the amplitude values of the outphasing signals $OP_1(t)$ and $OP_2(t)$ are larger than zero, and output signals having amplitude values of −1 when the amplitude values are smaller than zero. By doing so, the rectangularizing units 121 output rectangular-waveform outphasing signals $S_1(t)$ and $S_2(t)$. That is, the rectangular-waveform signals $S_1(t)$ and $S_2(t)$ are digital signals having amplitude values of 1 or −1.

Note that when the amplitude values of the outphasing signals $OP_1(t)$ and $OP_2(t)$ are zero, they may be made to correspond to (i.e., to be converted into) either signals having an amplitude value of 1 or signals having an amplitude value of −1. They can be made to correspond to either of them.

Note that the rectangular-waveform outphasing signals $S_1(t)$ and $S_2(t)$, which are the output signals of the first and second rectangularizing units 121a and 121b, are expressed by the below-shown Expressions 16 and 17.

$$S_1(t)=OP_1(t)+Rec(OP_1(t)) \quad \text{(Expression 16)}$$

$$S_2(t)=OP_2(t)+Rec(OP_2(t)) \quad \text{(Expression 17)}$$

Note that the function Rec(t) is a signal distortion component caused by the rectangularization process, and corresponds to the difference between the output signal and the input signal of the rectangularizing unit.

Note that the sum $S_{DES}(t)$ of the rectangular-waveform outphasing signals $S_1(t)$ and $S_2(t)$ is expressed by the below-shown Expression 18.

$$S_{DES}(t)=S_1(t)+S_2(t)=OP_1(t)+OP_2(t)+Rec(OP_1(t))+Rec(OP_2(t)) \quad \text{(Expression 18)}$$

Based on the fact that the sum of the outphasing signals $OP_1(t)$ and $OP_2(t)$ is equal to the desired signal IF(t), the above-shown Expression 18 can be transformed into the below-shown Expression 19. According to the Expression 19, the sum $S_{DES}(t)$ contains the desired signal IF(t) as its component.

$$S_{DES}(t)=IF(t)+Rec(OP_1(t))+Rec(OP_2(t)) \quad \text{(Expression 19)}$$

Next, the switch circuit 122 generates a combined signal $S_{12}(t)$ by combining the rectangular-waveform outphasing signals $S_1(t)$ and $S_2(t)$ in a time-division manner. Specifically, the input signals $S_1(t)$ and $S_2(t)$ are alternately output according to the H/L level of a clock signal CK output from a clock signal oscillator (not shown).

Figure 3:
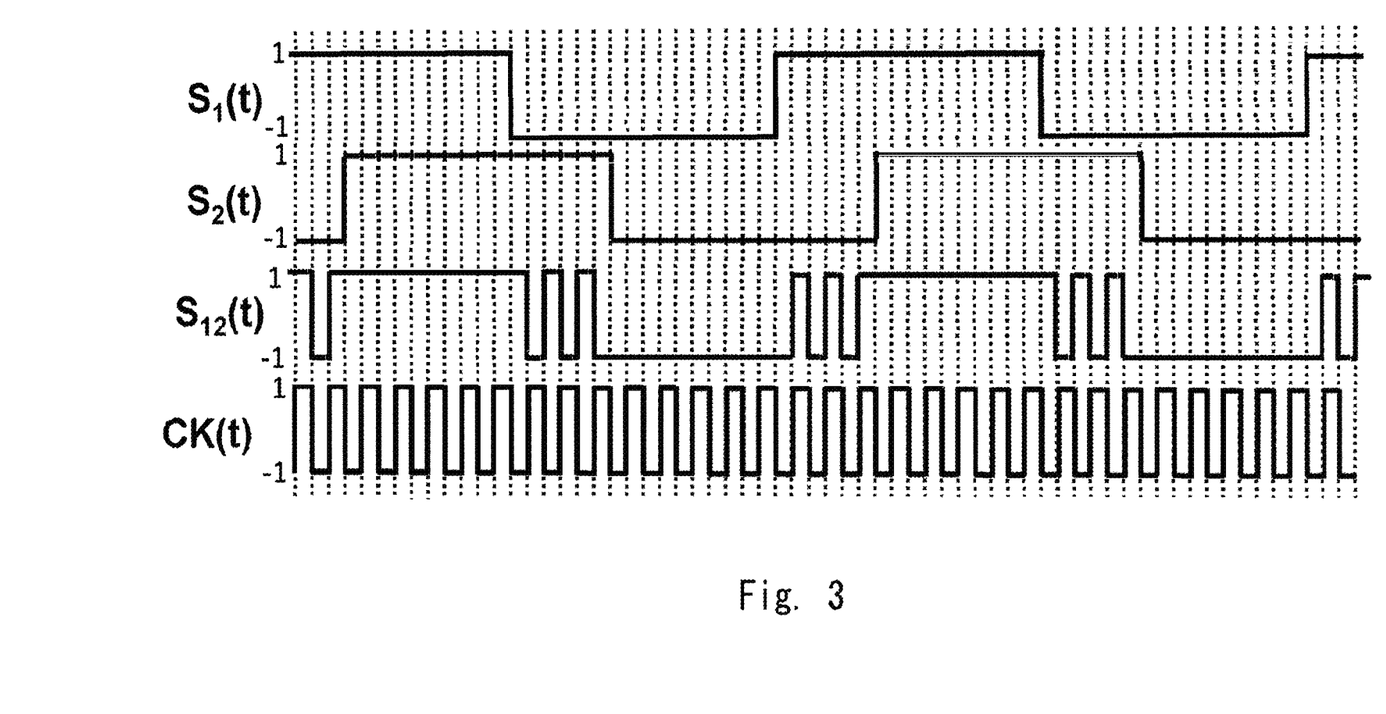
FIG. 3 is a graph showing waveforms of rectangular outphasing signals $S_1(t)$ and $S_2(t)$, a combined signal $S_{12}(t)$, and a clock signal CK(t) over time.

FIG. 3 is a graph showing waveforms of the rectangular-waveform outphasing signals $S_1(t)$ and $S_2(t)$, the combined signal $S_{12}(t)$, and the clock signal CK(t) over time.

As shown in FIG. 3, the switch circuit 122 outputs the rectangular-waveform outphasing signal $S_1(t)$ when the amplitude value of the clock signal is 1, and outputs the waveform of the rectangular-waveform outphasing signal $S_2(t)$ when the amplitude value of the clock signal is −1. As described above, the combined signal $S_{12}(t)$ is generated by alternately outputting the rectangular-waveform outphasing signals $S_1(t)$ and $S_2(t)$ in the predetermined cycle.

The combined signal $S_{12}(t)$ obtained from the switch circuit 122 is expressed by the below-shown Expression 20.

$$S_{12}(t)=S_1(t)\cdot\{CK(t)+1\}/2+S_2(t)\cdot\{-CK(t)+1\}/2 \quad \text{(Expression 20)}$$

Further, by transforming the above-shown Expression 20, the output signal $S_{12}(t)$ is expressed by the below-shown Expression 21.

$$S_{12}(t)=[S_1(t)+S_2(t)+\{S_1(t)-S_2(t)\}\cdot CK(t)]/2 \quad \text{(Expression 21)}$$

Further, based on the Expression 18, the output signal $S_{12}(t)$ is expressed by the below-shown Expression 22.

$$S_{12}(t)=[S_{DES}(t)+\{S_1(t)-S_2(t)\}\cdot CK(t)]/2 \quad \text{(Expression 22)}$$

As shown by the Expression 22, the combined signal $S_{12}(t)$ contains the sum $S_{DES}(t)$ expressed by the Expressions 18 and 19. Among the signal components contained in the combined signal $S_{12}(t)$, signal components other than the sum $S_{DES}(t)$ are unnecessary signal components. Note that when the frequency of the clock signal CK(t) is sufficiently high, the frequency band occupied by the unnecessary signal components is sufficiently higher than the frequency band of the sum $S_{DES}(t)$.

Next, the optical fiber module 3 transmits the combined signal $S_{12}(t)$ output from the switch circuit 122 to the receiving apparatus 2.

More specifically, the electric-optical converter E/O converts the combined signal $S_{12}(t)$ output from the switch circuit 122 into an optical signal, and transmits the optical signal to the optical-electric converter O/E through the optical fiber 31. Next, the optical-electric converter O/E re-converts the received optical signal into an electric signal, i.e., restores it into the combined signal $S_{12}(t)$, and outputs the combined signal $S_{12}(t)$ to the receiving apparatus 2.

Next, the mixer circuit 21 acquires the combined signal $S_{12}(t)$ from the optical-electric converter O/E and converts the frequency thereof. Note that when the frequency of the desired signal IF(t) is represented by $f_{IF}$ and the frequency of the external LO signal is represented by $f_{LO}$, the frequency components $f_{IF}+f_{LO}$ and $f_{IF}-f_{LO}$ are contained in the combined signal $S_{12}(t)$ of which the frequency has been converted by the mixer circuit 21.

Note that when the frequency of a radio signal that is eventually emitted is represented by $f_{DES}$, the frequency $f_{LO}$ of the external LO signal is preferably set to a frequency $f_{DES}-f_{IF}$ or $f_{DES}+f_{IF}$.

Next, the power amplifier AMP amplifies the frequency-converted combined signal $S_{12}(t)$. Then, the band-pass filter BPF removes unnecessary frequency components from the amplified combined signal $S_{12}(t)$.

Note that the band-pass filter BPF selects one of the above-described frequency components $f_{IF}+f_{LO}$ and $f_{IF}-f_{LO}$, and removes frequency components other than the selected frequency component as unnecessary frequency components.

Further, as described above, when the frequency of the clock signal CK(t) is sufficiently high, the frequency band occupied by the unnecessary signal components is sufficiently higher than the frequency band of the sum $S_{DES}(t)$. Therefore, when the frequency of the clock signal CK(t) is sufficiently high, the band-pass filter BPF can sufficiently remove unnecessary signal components.

Lastly, the antenna 22 emits (i.e., transmits) the radio signal output from the band-pass filter BPF, and with this, the series of operations has been completed.

As described above, the communication system 1001 according to this example embodiment combines outphasing signals in a time-division manner and transmits the combined signal thereof, so that the communication system 1001 can transmit the outphasing signals through one transmission route. Therefore, the communication system 1001 according to this example embodiment makes it possible to simplify the configuration of the apparatus that is required to transmit outphasing signals.

Other Example Embodiment

Figure 4:
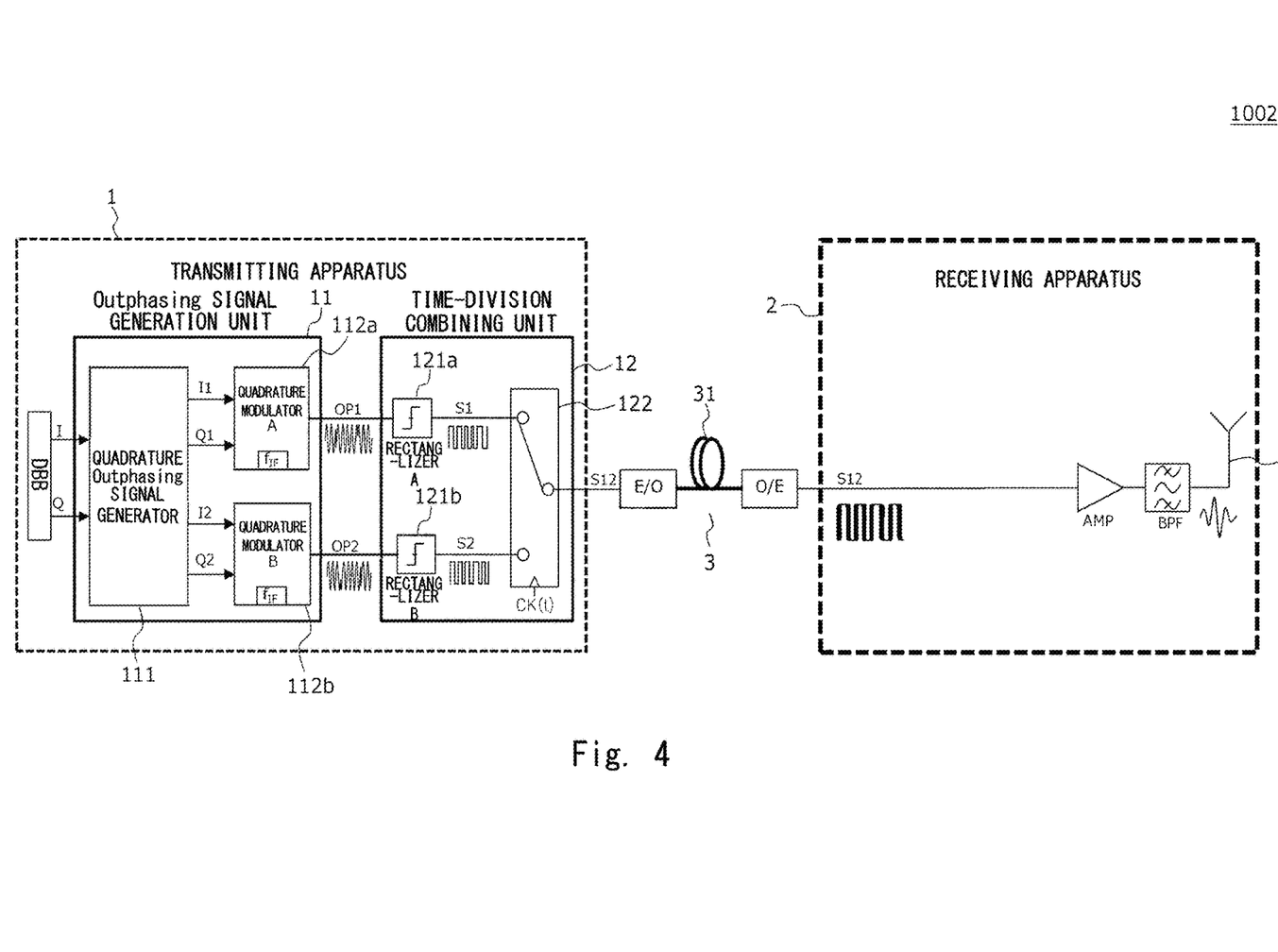
FIG. 4 is a block diagram showing a configuration of a communication system 1002 according to another example embodiment.

FIG. 4 is a block diagram showing a configuration of a communication system 1002 according to another example embodiment. The communication system 1002 differs from the communication system 1001 according to the first example embodiment in that the receiving apparatus 2 does not include the mixer circuit 21.

In the communication system 1002, the combined signal $S_{12}$ is emitted (i.e., transmitted) from the antenna through the power amplifier AMP and the band-pass filter BPF. That is, the frequency of the radio signal emitted from the antenna 22 corresponds to the intermediate frequency that is set during the generation of the rectangular-waveform outphasing signals $S_1$ and $S_2$.

By the above-described configuration, the communication system 1002 makes it possible to simplify the configuration of the receiving apparatus 2.

Figure 5:
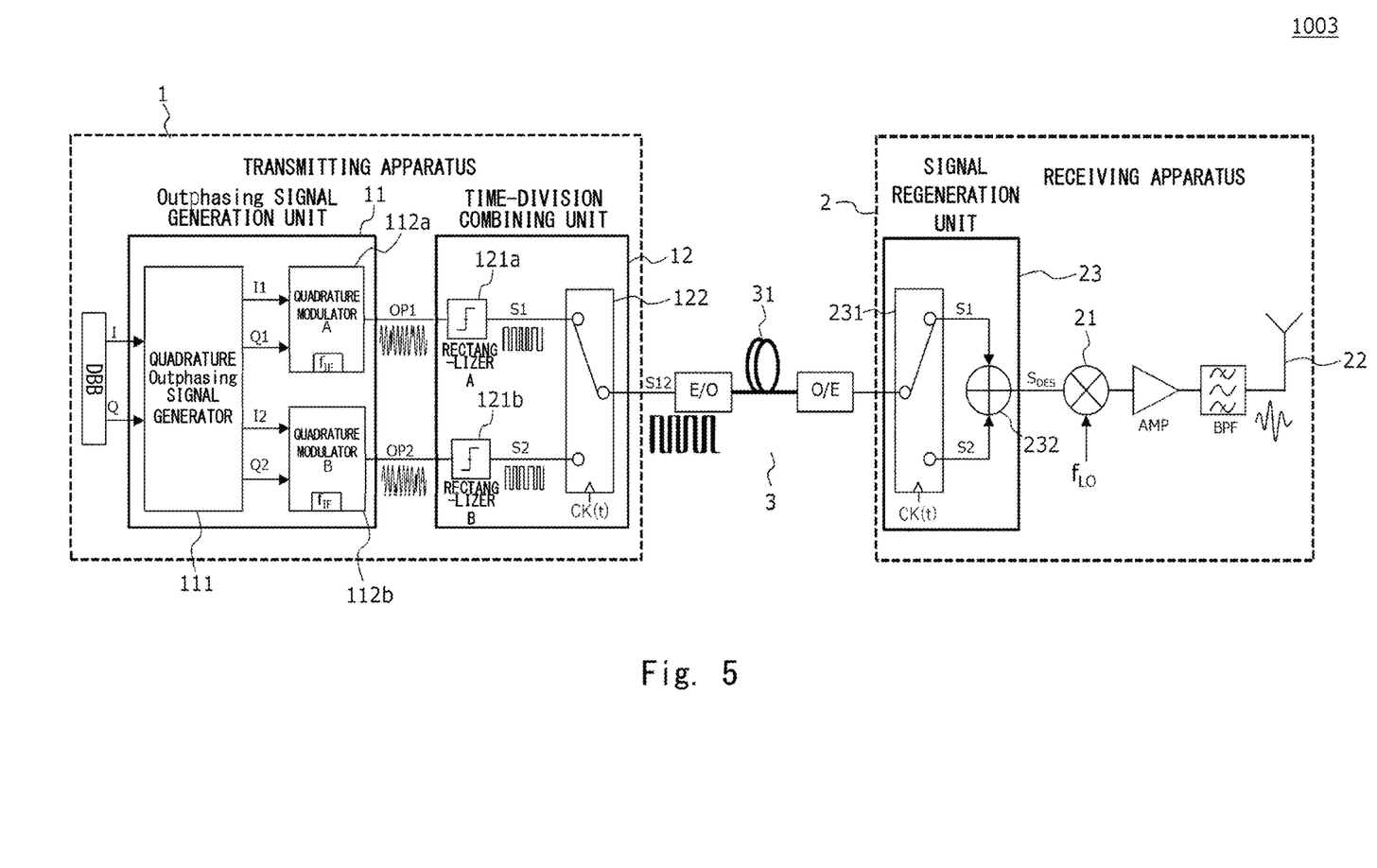
FIG. 5 is a block diagram showing a configuration of a communication system 1003 according to another example embodiment.

FIG. 5 is a block diagram showing a configuration of a communication system 1003 according to another example embodiment. The communication system 1003 differs from the communication system 1001 according to the first example embodiment in that the receiving apparatus 2 includes a signal regeneration unit 23.

The signal regeneration unit 23 includes a switch circuit 231 and an adder 232. The switch circuit 231 separates the combined signal $S_{12}$ into rectangular-waveform outphasing signals $S_1$ and $S_2$. Further, the adder 232 combines the separated rectangular-waveform outphasing signals $S_1$ and $S_2$, and thereby outputs a signal $S_{DES}$ to the mixer circuit 21.

By the above-described configuration, it is possible to prevent unnecessary signal components from being generated due to the time-division combining process.

Figure 6:
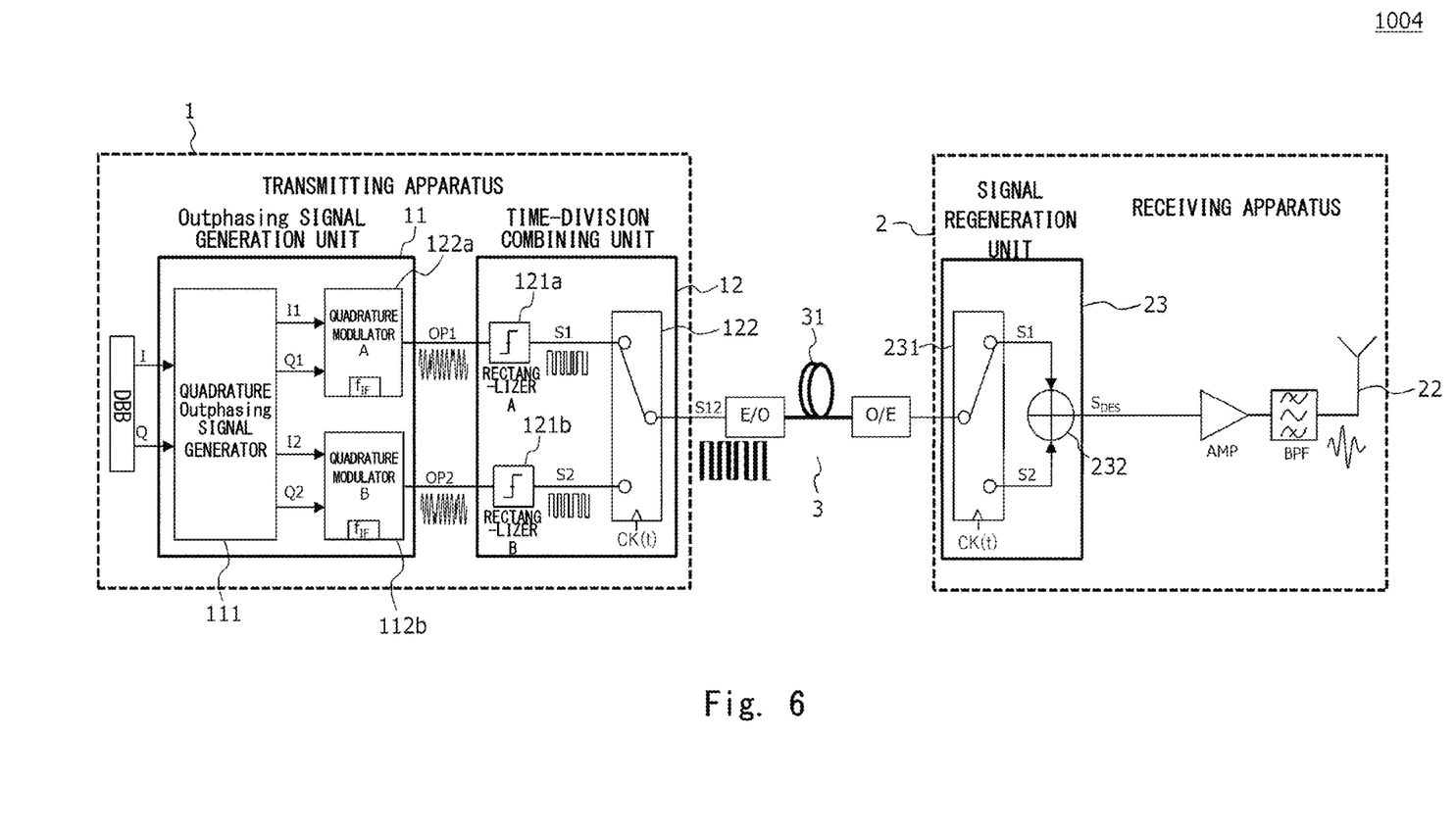
FIG. 6 is a block diagram showing a configuration of a communication system 1004 according to another example embodiment.

FIG. 6 is a block diagram showing a configuration of a communication system 1004 according to another example embodiment. The communication system 1004 differs from the communication system 1001 according to the first example embodiment in that the receiving apparatus 2 does not include the mixer circuit 21 and includes a signal regeneration unit 23.

In the communication system 1004, the output signal of the signal regeneration unit 23 is emitted from the antenna 22 through the power amplifier AMP and the band-pass filter BPF. That is, similarly to the communication system 1002, the frequency of the radio signal emitted from the antenna corresponds to the intermediate frequency of the rectangular-waveform outphasing signals $S_1$ and $S_2$. By the above-described configuration, the communication system 1004 makes it possible to simplify the configuration of the receiving apparatus 2 as compared to that in the communication system 1003.

Figure 7:
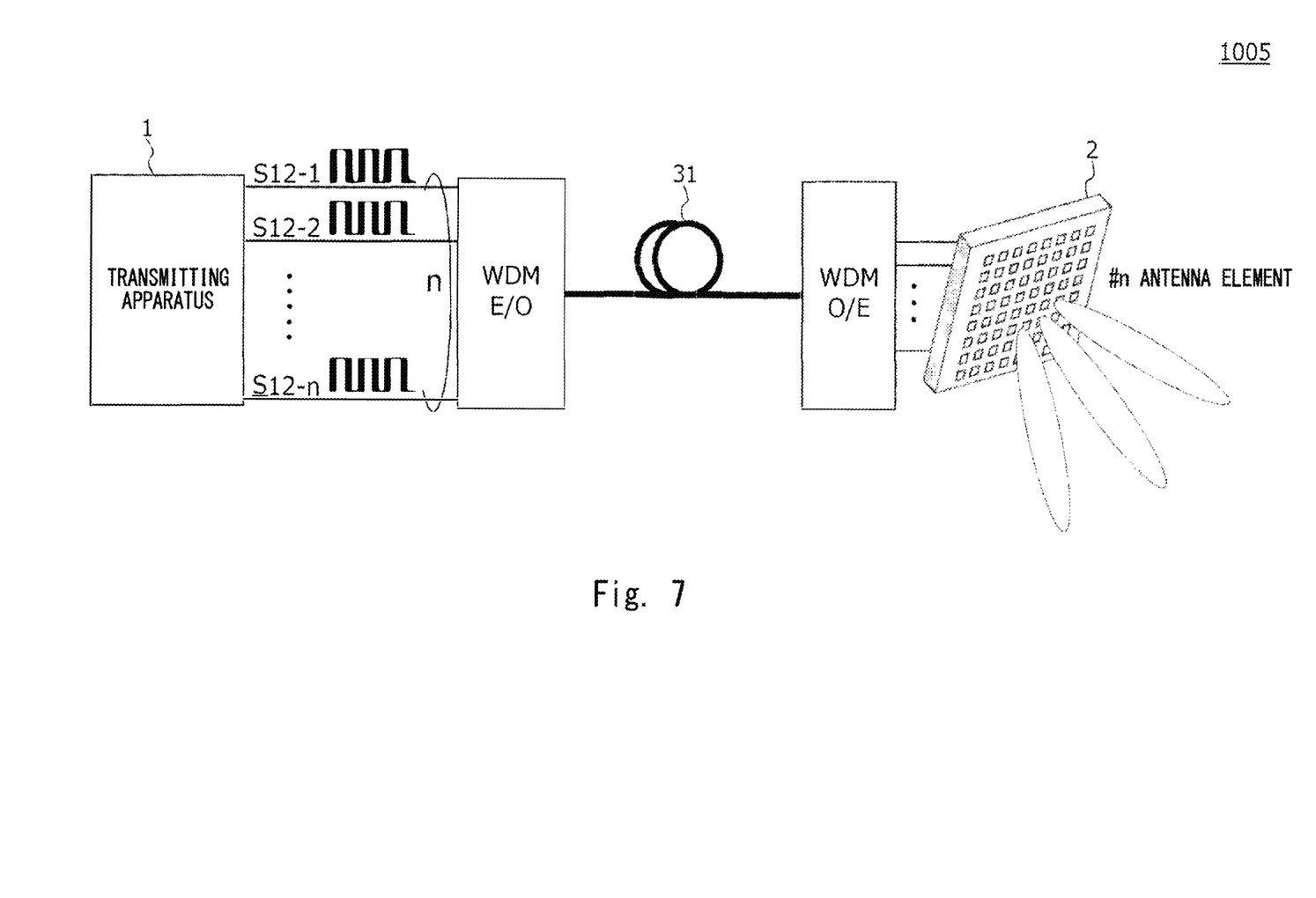
FIG. 7 is a block diagram showing a configuration of a communication system 1005 according to another example embodiment.

FIG. 7 is a block diagram showing a configuration of a communication system 1005 according to another example embodiment. The communication system 1005 is an example of an application of the communication system 1001 or 1002. The communication system 1005 is an example in which massive MIMO (Multiple Input and Multiple Output) transmission is applied to the communication system 1001 or 1002. That is, the communication system 1005 is an example in which a plurality of time-division combined signals are wavelength-multiplexed and the wavelength-multiplexed signal is transmitted.

Figure 8:
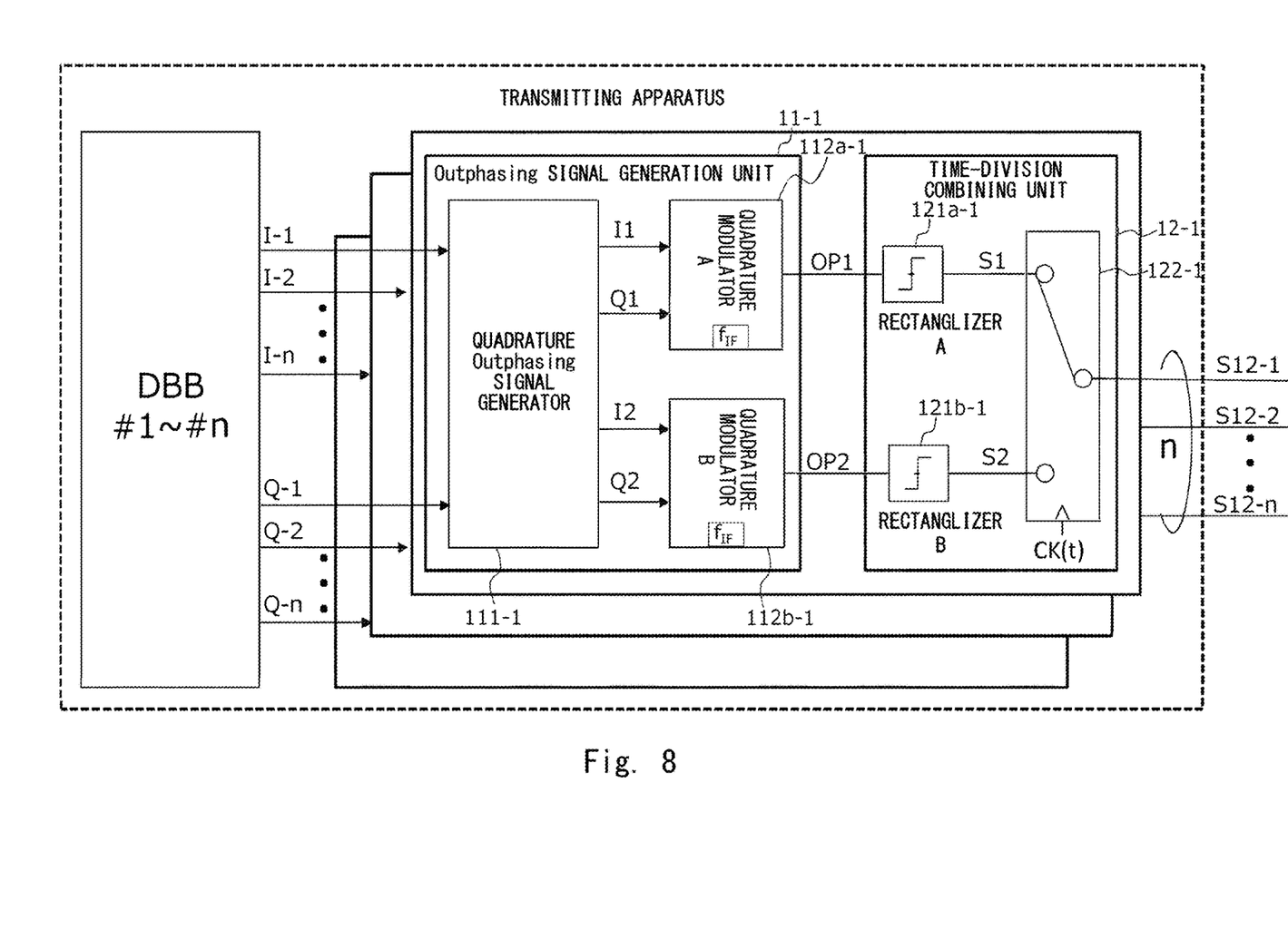
FIG. 8 is a block diagram showing a configuration of a transmitting apparatus 1 for the communication system 1005.

FIG. 8 is a block diagram showing a configuration of a transmitting apparatus 1 for the communication system 1005.

Unlike the communication systems 1001 and 1002, the transmitting apparatus 1 for the communication system 1005 includes, inside the one apparatus, n outphasing signal generation units 11 and n time-division combining units 12. Note that n is an integer greater than two.

Further, unlike the communication system 1002, the transmitting apparatus 1 is connected to a converter WDM-E/O capable of wavelength-division-multiplexing a plurality of signals and transmitting the wavelength-division-multiplexed signal.

In the transmitting apparatus 1 for the communication system 1005, firstly, the digital baseband unit DBB outputs n pairs of quadrature radio signals I and Q. Next, the aforementioned n outphasing signal generation units 11 and the n time-division combining units 12 generate n combined signals Sit, i.e., the combined signals $S_{12}$-1 to $S_{12}$-n. The transmitting apparatus 1 for the communication system 1005 outputs these n combined signals $S_{12}$-1 to $S_{12}$-n to the converter WDM-E/O. The converter WDM-E/O converts the n combined signals $S_{12}$-1 to $S_{12}$-n into optical signals, performs wavelength-division multiplexing for them, and transmits the resultant signal to the receiving apparatus 2 through an optical fiber.

Figure 9:
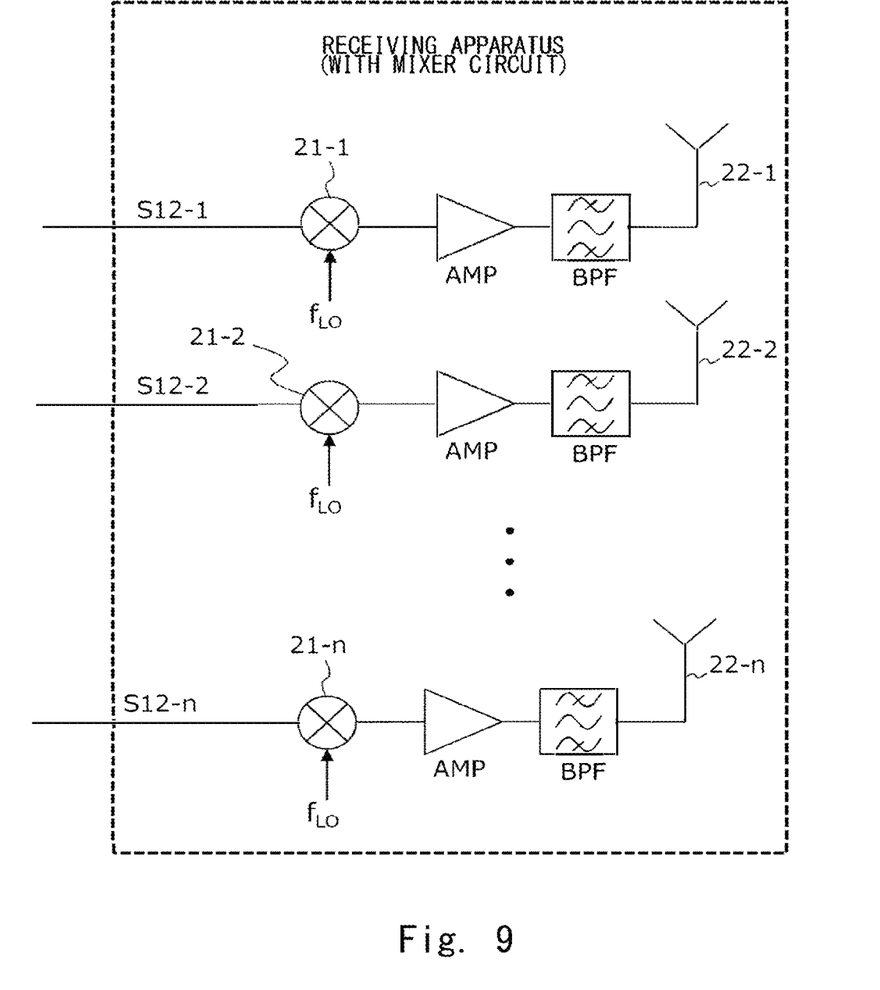
FIG. 9 is a block diagram showing a configuration of a receiving apparatus 2 for the communication system 1005.
Figure 10:
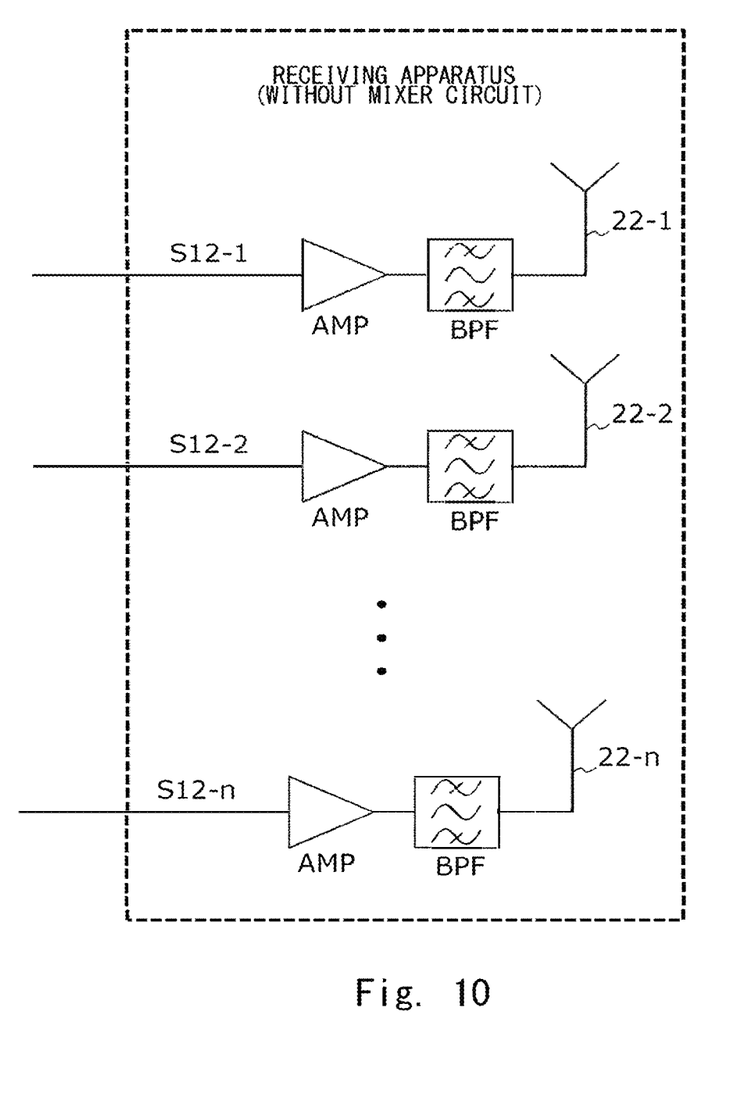
FIG. 10 is a block diagram showing a configuration of the receiving apparatus 2 for the communication system 1005.

Each of FIGS. 9 and 10 is a block diagram showing a configuration of a receiving apparatus 2 for the communication system 1005.

FIG. 9 shows a configuration of a receiving apparatus 2 including a mixer circuit 21, and FIG. 10 shows a configuration of a receiving apparatus 2 including no mixer circuit 21. Either of the configurations is applicable.

In the case of FIG. 9, the receiving apparatus 2 for the communication system 1005 includes n mixer circuits 21, n power amplifiers AMPs, n band-pass filters BPFs, and n antennas 22. Meanwhile, in the case of FIG. 10, the receiving apparatus 2 includes n power amplifiers AMPs, n band-pass filters BPFs, and n antennas 22.

Further, the receiving apparatus 2 for the communication system 1005 is connected to a converter WDM-O/E capable of separating a wavelength-multiplexed optical signal and converting the separated optical signals into electric signals.

The converter WDM-O/E separates the wavelength-multiplexed optical signal received from the converter WDM-E/O and re-converts the separated optical signals into electric signals, i.e., restores them into the n combined signals $S_{12}$-1 to $S_{12}$-n. Further, similarly to the communication system 1001 or 1002, the receiving apparatus 2 converts the combined signals $S_{12}$-1 to $S_{12}$-n into radio signals and emits (i.e., transmits) the radio signals from the plurality of antennas 22-1 to 22-n.

By the above-described configuration, it is possible to perform beam forming for an arbitrary number of users.

Further, by wavelength-multiplexing n signals and transmitting the wavelength-multiplexed signal, the number of optical fibers can be reduced and the cost can be reduced.

Figure 11:
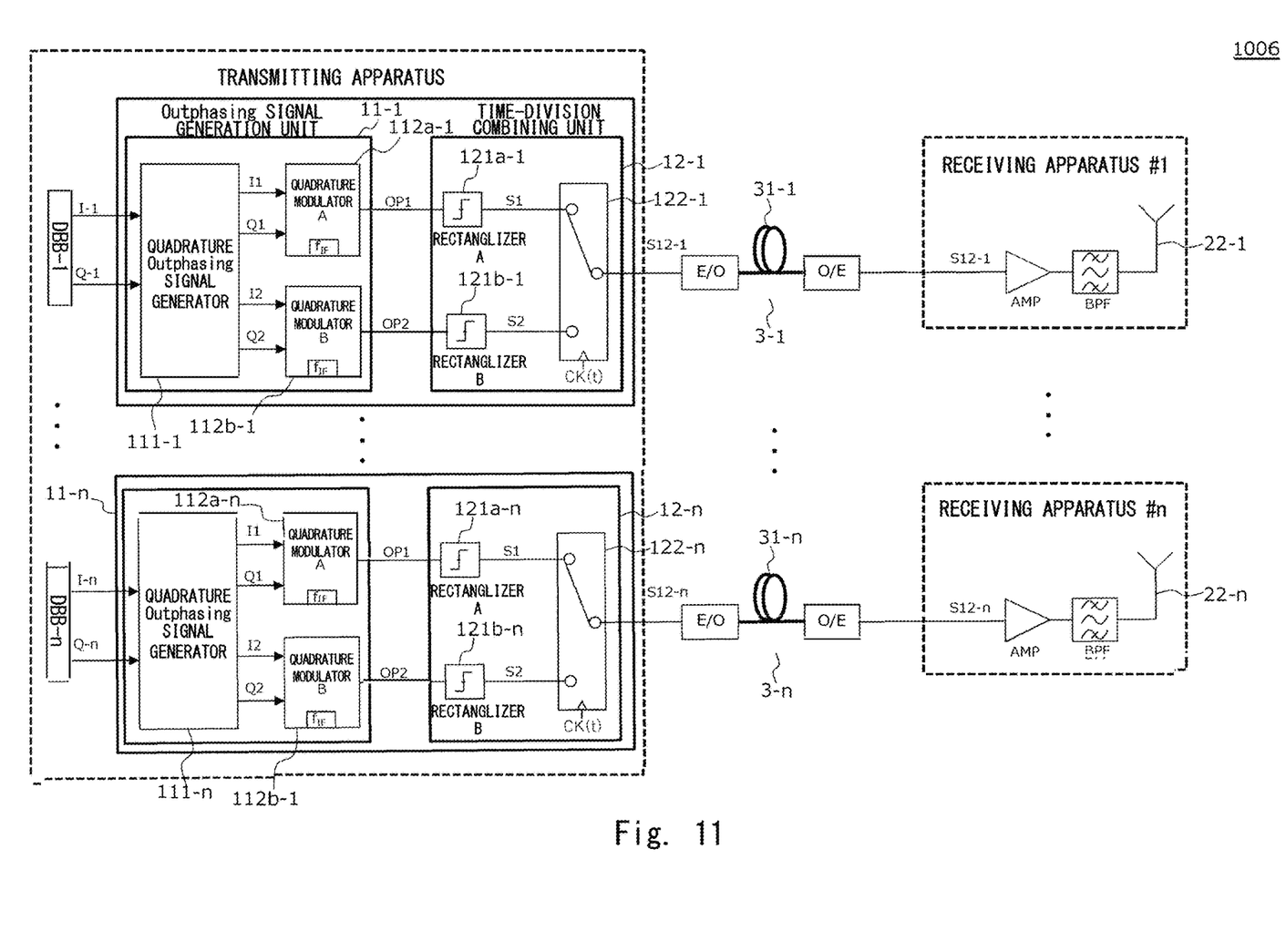
FIG. 11 is a block diagram showing a configuration of a communication system 1006 according to another example embodiment.

FIG. 11 is a block diagram showing a configuration of a communication system 1006 according to another example embodiment. The communication system 1006 is an example of an application of the communication system 1001 or 1002. The communication system 1006 is an example in which distributed MIMO transmission is applied to the communication system 1001 or 1002.

In the transmitting apparatus 1 for the communication system 1006, firstly, n digital baseband units DBB-1 to DBB-n output n pairs of quadrature radio signals I and Q.

Next, the n pairs of quadrature radio signals I and Q are converted into combined signals $S_{12}$-1 to $S_{12}$-n, respectively, through outphasing signal generation units and time-division combining units. These signals are electric-optically converted, and the plurality of combined signals $S_{12}$-1 to $S_{12}$-n are transmitted to respective different receiving apparatuses 2.

Note that although the receiving apparatus 2 includes no mixer circuit 21 in FIG. 11, the receiving apparatus 2 may include a mixer circuit(s) 21.

Figure 12:
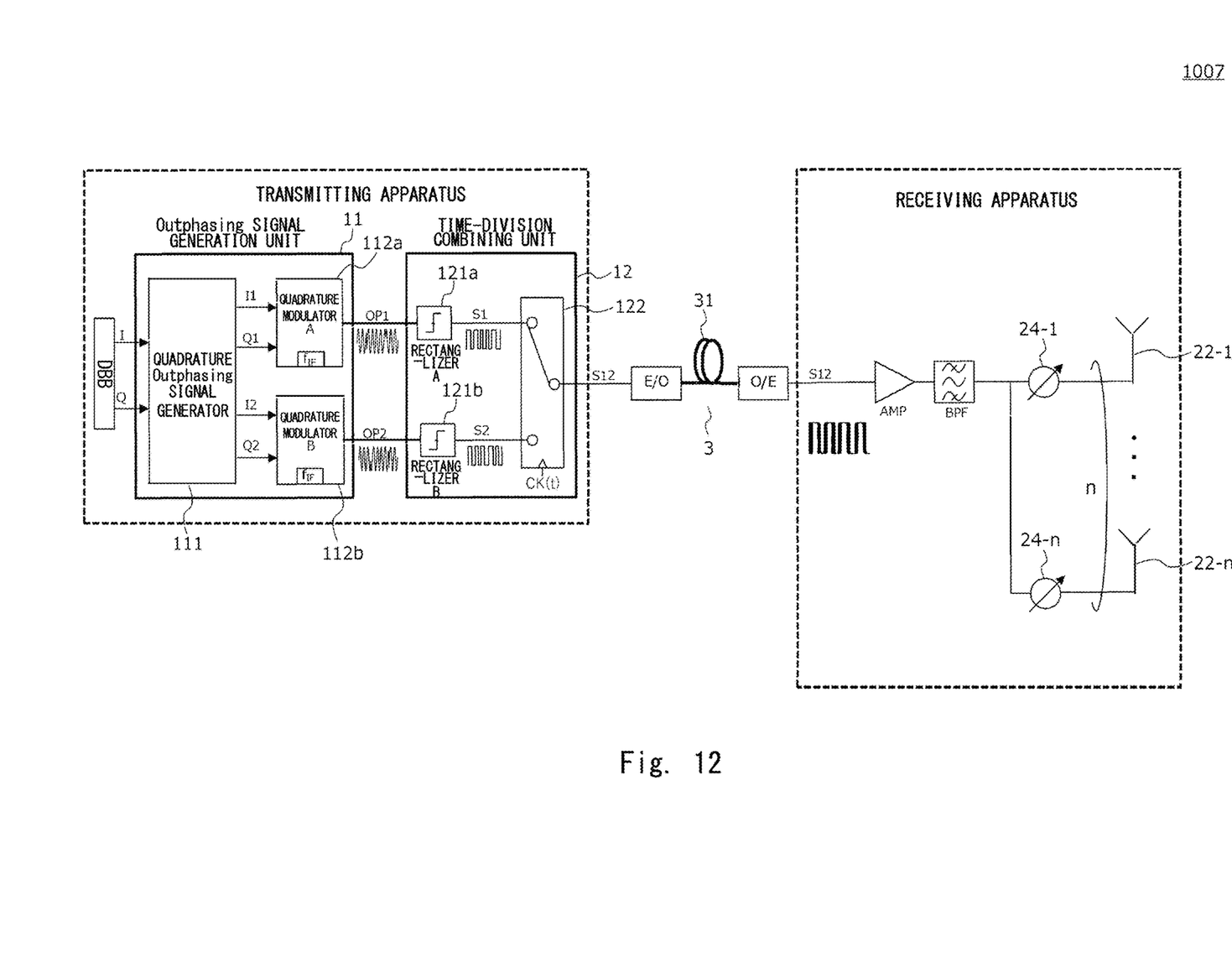
FIG. 12 is a block diagram showing a configuration of a communication system 1007 according to another example embodiment.

FIG. 12 is a block diagram showing a configuration of a communication system 1007 according to another example embodiment. The communication system 1007 is an example of an application of the communication system 1001 or 1002. The communication system 1007 is an example in which an analog beamforming function is added to the receiving apparatus 2 for the communication system 1001 or 1002.

The receiving apparatus 2 for the communication system 1007 includes n phasers 24-1 to 24-*n*, and antennas 22-1 to 22-*n*.

The phasers 24-1 to 24-*n* adjust the phases of radio signals output from the band-pass filters BPFs and output the phase-adjusted radio signals to the antennas 22-1 to 22-*n*, which correspond to the phasers 24-1 to 24-*n*, respectively. By emitting the phase-adjusted radio signals, the antennas 22-1 to 22-*n* can transmit the radio signals in arbitrary directions.

Note that analog beamforming feeding circuits may be used in place of the phasers.

Further, although the receiving apparatus 2 includes no mixer circuit 21 in FIG. 12, the receiving apparatus 2 may include a mixer circuit(s) 21.

According to the present disclosure, it is possible to provide a transmitting apparatus, a receiving apparatus, a communication system, and a communication method capable of simplifying the configuration of an apparatus(es) necessary for transmitting an outphasing signal.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A transmitting apparatus comprising:
    a digital baseband unit configured to separate a baseband signal into an in-phase component I and a quadrature component Q, and output the in-phase and quadrature components I,Q;
    an outphasing signal generation unit configured to generate a first signal pair including an in-phase component $I_1$ and a quadrature component $Q_1$ and a second signal pair including an in-phase component $I_2$ and a quadrature component $Q_2$ based on the in-phase and quadrature components I,Q, wherein the in-phase component $I_1$ and the quadrature component $Q_1$ in the first signal pair have 90° different phase and the in-phase component $I_2$ and the quadrature component $Q_2$ in the second signal pair have 90° different phase, then quadrature-modulating the first signal pair for a first output $OP_1$, in parallel with quadrature-modulating the second signal pair for a second output $OP_2$; and
    a time-division combining unit configured to combine the first and second output $OP_1$, $OP_2$ in a time-division manner to generate a time-division combined signal.

2. The transmitting apparatus according to claim 1, further comprising a rectangularizing unit configured to convert waveforms of the first and second output $OP_1$, $OP_2$ generated by the outphasing signal generation unit into rectangular waveforms, wherein
    the time-division combining unit combines the first and second rectangular-waveform output $OP_1$, $OP_2$ in a time-division manner.

3. The transmitting apparatus according to claim 1, wherein the time-division combining unit combines the first and second output $OP_1$, $OP_2$ in a time-division manner by alternately outputting the first and second output $OP_1$, $OP_2$ in a predetermined cycle.

4. The transmitting apparatus according to claim 1, wherein a plurality of time-division combine signals are wavelength-division multiplexed, and the wavelength-division multiplexed signal is transmitted.

5. A receiving apparatus comprising:
    an amplifier configured to amplify the time-division combined signal transmitted from the transmitting apparatus according to claim 1;
    a band-pass filter configured to generate a radio signal by removing a frequency component contained in a predetermined frequency band from a signal obtained by amplifying the time-division combined signal; and
    an antenna configured to emit the radio signal.

6. The receiving apparatus according to claim 5, wherein
    the time-division combine signal is separated into a plurality of signals, and
    the radio signal is generated based on a signal obtained by adding separated signals to each other.

7. The receiving apparatus according to claim 5, further comprising a mixer, wherein
    the time-division combine signal is multiplied by a signal having a predetermined frequency, and
    the radio signal is generated based on the multiplied signal.

8. A communication system comprising:
    a transmitting apparatus and a receiving apparatus connected to the transmitting apparatus through an optical fiber module, wherein
    the transmitting apparatus comprises:
    a digital baseband unit configured to separate a baseband signal into an in-phase component I and a quadrature component Q, and output the in-phase and quadrature components I,Q;
    an outphasing signal generation unit configured to generate a first signal pair including an in-phase component $I_1$ and a quadrature component $Q_1$ and a second signal pair including an in-phase component $I_2$ and a quadrature component $Q_2$ based on the in-phase and quadrature components I,Q, wherein the in-phase component $I_1$ and the quadrature component $Q_1$ in the first signal pair have 90° different phase and the in-phase component $I_2$ and the quadrature component $Q_2$ in the second signal pair have 90° different phase, then quadrature-modulating the first signal pair for a first output $OP_1$, in parallel with quadrature-modulating the second signal pair for a second output $OP_2$; and
    a time-division combining unit configured to combine the first and second output $OP_1$, $OP_2$ in a time-division manner to generate a time-division combined signal.

9. The communication system according to claim 8, wherein the receiving apparatus comprises:
    an amplifier configured to amplify the time-division combined signal transmitted from the transmitting apparatus;

a band-pass filter configured to generate a radio signal by removing a frequency component contained in a predetermined frequency band from a signal obtained by amplifying the time-division combined signal; and an antenna configured to emit the radio signal.

10. A communication method comprising:

separating a baseband signal into an in-phase component I and a quadrature component Q, and output the in-phase and quadrature components I,Q;

generating a first signal pair including an in-phase component $I_1$ and a quadrature component $Q_1$ and a second signal pair including an in-phase component $I_2$ and a quadrature component $Q_2$ based on the in-phase and quadrature components I,Q, wherein the in-phase component $I_1$ and the quadrature component $Q_1$ in the first signal pair have 90° different phase and the in-phase component $I_2$ and the quadrature component $Q_2$ in the second signal pair have 90° different phase, then quadrature-modulating the first signal pair for a first output $OP_1$, in parallel with quadrature-modulating the second signal pair for a second output $OP_2$;

combining the first and second output $OP_1$, $OP_2$ in a time-division manner to generate a time-division combined signal;

transmitting the generated time-division combined signal from a transmitting side to a receiving side; and receiving the signal transmitted from the transmitting side on the receiving side.

* * * * *